United States Patent
Liu (10) Patent No.: US 11,400,838 B2
(45) Date of Patent: Aug. 2, 2022

(54) SEAT ORIENTATION ADJUSTMENT DEVICE AND SAFETY SEAT

(71) Applicant: SUNNYLOVE BABY PRODUCTS ZHUHAI CO., LTD., Guangdong (CN)

(72) Inventor: Xiuping Liu, Guangdong (CN)

(73) Assignee: SUNNYLOVE BABY PRODUCTS ZHUHAI CO., LTD., Guangdong (CN)

( * ) Notice: Subject to any disclaimer, the term of this patent is extended or adjusted under 35 U.S.C. 154(b) by 53 days.

(21) Appl. No.: 16/763,108

(22) PCT Filed: Jan. 12, 2018

(86) PCT No.: PCT/CN2018/072437
§ 371 (c)(1),
(2) Date: May 11, 2020

(87) PCT Pub. No.: WO2019/100567
PCT Pub. Date: May 31, 2019

(65) Prior Publication Data
US 2020/0276920 A1     Sep. 3, 2020

(30) Foreign Application Priority Data

Nov. 27, 2017 (CN) .......................... 201711202455.1

(51) Int. Cl.
*B60N 2/28* (2006.01)
*A47D 1/00* (2006.01)

(52) U.S. Cl.
CPC ........... *B60N 2/2875* (2013.01); *A47D 1/002* (2013.01); *B60N 2/2821* (2013.01)

(58) Field of Classification Search
CPC ............................ B60N 2/2875; B60N 2/2821
See application file for complete search history.

(56) References Cited

U.S. PATENT DOCUMENTS

| 5,551,751 A * | 9/1996 | Sedlack ............... B60N 2/2875 297/216.11 |
| 6,820,939 B1 | 11/2004 | Chen |
| 2003/0151284 A1 | 8/2003 | Dukes |

FOREIGN PATENT DOCUMENTS

| CN | 204547845 U | 8/2015 |
| CN | 205632187 U | 10/2016 |
| CN | 205706270 U | 11/2016 |

OTHER PUBLICATIONS

International Search Report and Written Opinion dated Aug. 30, 2018 in International Application PCT/CN2018/072437.

* cited by examiner

*Primary Examiner* — Anthony D Barfield
(74) *Attorney, Agent, or Firm* — Venable LLP (57) ABSTRACT

The present disclosure relates to a seat posture adjustment device and a safety seat. The seat posture adjustment device comprises a locking member (5), a support rod (3) arranged on a seat body (1) and a guide groove (4) formed in a seat support (2), wherein the support rod (3) is inserted into the guide groove (4) to connect the seat body (1) and the seat support (2), and the support rod (3) is movable along the guide groove (4) to realize the posture adjustment of the seat body (1), and the locking member (5) is arranged on the support rod (3) and movable relative to the support rod (3) to realize locking or unlocking between the seat body (1) and the seat support (2). The locking member is arranged on the support rod which guides the locking member, and the support rod still has a connecting effect in an unlocking state, so that the locking member is reset more smoothly and accurately.

19 Claims, 8 Drawing Sheets

SEAT ORIENTATION ADJUSTMENT DEVICE AND SAFETY SEAT

CROSS REFERENCE TO RELATED APPLICATION

This application is a national stage application, filed under 35 U.S.C. § 371, of International Application No. PCT/CN2018/072437, filed on Jan. 12, 2018, entitled "SEAT ORIENTATION ADJUSTMENT DEVICE AND SAFETY SEAT," which claims priority to Chinese Patent Application No. 201711202455.1 filed on Nov. 27, 2017, which is incorporated herein by reference in its entirety.

FIELD OF THE INVENTION

The present disclosure relates to the technical field of safety seats, in particular to a seat posture adjustment device and a safety seat.

BACKGROUND OF THE INVENTION

In order to better adapt to comfort and safety requirements of riding children, the posture (the tilt angle of the seat back) of a child safety seat is mostly adjustable. The posture of the child safety seat can be adjusted to a suitable angle at any time according to the child's age and safety.

In order to realize the posture adjustment function, the child safety seat is generally provided with a seat posture adjustment device. In the relevant art, the posture adjusting device includes a locking member divided into two sections which can move relative to each other, and when the locking member stretches out, the seat body and the seat support can be fixed relatively. When the locking member retracts, the locking between the seat body and the seat support is released, and the posture of the seat body can be adjusted; and after the adjustment is completed, the seat body and the seat support can be relocked by the reset of the locking member.

Although this structure can realize the adjustment of the seat posture, the locking member usually needs to be placed in a special box together with a matched transmission mechanism, and then arranged between the seat body and the seat support, so that the posture adjusting device is relatively complicated in structure and occupies a large space which makes the overall volume of the seat body and the seat support be large. In addition, when the posture of the seat body is adjusted, the two sections of the locking member retract from the seat body and the seat support, and the seat body and the seat support at the moment are disconnected. In the event of an accident during the adjustment, the seat body may deviate from the seat support, and the alignment of the seat body and the seat support cannot be ensured, which may cause the problem that the locking member cannot be reset successfully and cause unnecessary trouble.

SUMMARY OF THE INVENTION

The objective of the present disclosure is to provide a seat posture adjustment device and a safety seat to improve the adjustment performance of the seat posture adjustment device as much as possible.

To achieve the above objective, the present disclosure provides a seat posture adjustment device including a locking member, a support rod arranged on a seat body and a guide groove formed in a seat support, wherein the support rod is inserted into the guide groove to connect the seat body and the seat support, the support rod is movable along the guide groove to realize the posture adjustment of the seat body, and the locking member is arranged on the support rod and movable relative to the support rod to realize locking or unlocking between the seat body and the seat support.

In some embodiments, the locking member is hollow, sleeved on the support rod and slidable relative to the support rod in the axial direction of the support rod.

In some embodiments, the seat posture adjustment device further includes a fitting structure, the fitting structure is fit with the locking member to realize relative locking of the seat body and the seat support when the locking member moves to a locking position, and disengages the fitting with the locking member to release the relative locking of the seat body and the seat support when the locking member departs from the locking position.

In some embodiments, the fitting structure includes a plurality of limit holes formed on the inner side of the seat support, the plurality of limit holes are arranged along the trajectory of the guide groove, and the locking member is inserted into a limit hole to realize the relative locking of the seat body and the seat support when the locking member moves to the locking position; and is disengaged from the limit hole to release the relative locking of the seat body and the seat support when the locking member departs from the locking position.

In some embodiments, the trajectory of the guide groove is an arc.

In some embodiments, the limit holes are counter bores.

In some embodiments, the seat posture adjustment device further includes a first elastic member for resetting the locking member.

In some embodiments, the seat posture adjustment device includes two locking members movable relative to the support rod, the first elastic member comprises a spring, the spring and the two locking members are sleeved on the support rod, and the spring is arranged between the two locking members.

In some embodiments, the seat posture adjustment device further includes an operation member, the operation member is configured to force the locking member to move relative to the support rod.

In some embodiments, the operation member includes a pull plate arranged on the seat body, the pull plate is provided with a chute arranged obliquely with respect to the axial direction of the support rod, the locking member is provided with a locking pillar which is inserted into the chute, and the locking pillar and the locking member are driven through the chute to move relative to the support rod when the pull plate is pulled.

In some embodiments, the seat posture adjustment device further includes a handle connected with the pull plate, and the handle is arranged on the bottom surface of the seat body and close to the front end of the seat body.

In some embodiments, the seat posture adjustment device further includes a second elastic member connected to the pull plate for resetting the pull plate.

In some embodiments, two second elastic members are arranged symmetrically about a center line of the pull plate.

In some embodiments, the seat posture adjustment device further includes a first limit structure for limiting the maximum movement distance of the pull plate.

In some embodiments, the first limit structure includes a first limit boss formed on the seat body and a limit slot formed in the pull plate, and the first limit boss is inserted into the limit slot to limit the maximum movement distance of the pull plate.

In some embodiments, the seat posture adjustment device further includes a second limit structure for limiting the movement path of the pull plate.

In some embodiments, the second limit structure includes a substantially L-shaped second limit boss on the seat body, the second limit boss extends in the front and rear direction of the seat body, the pull plate is located between the second limit boss and the bottom surface of the seat body, and the pull plate is supported by the second limit boss and movable in the extending direction of the second limit boss.

In order to achieve the above objective, the present disclosure further provides a safety seat including the above seat posture adjustment device.

In some embodiments, the seat support is provided with an open slot, the open slot communicates with the guide groove, and the support rod is assembled into the guide groove through the open slot.

Based on the above technical solution, the locking member is arranged on the support rod, and moves relative to the support rod when the posture of the seat body is adjusted to realize locking or unlocking between the seat body and the seat support; in this way, the support rod plays a certain role in guiding the movement of the locking member, so that the reset of the locking member is smoother and more precise, and the reliability is improved. Moreover, the support rod is arranged on the seat body and inserted into the guide groove formed in the seat support, and the support rod remains stationary and can always play a role in connecting the seat body and the seat support during the movement of the locking member, so during the posture adjustment of the seat body, the deviation between the seat body and the seat support can be avoided, and the alignment of the seat body and the seat support can be maintained, which can further ensure the smooth reset of the locking member and improve the adjustment performance of the seat posture adjustment device.

Other features and advantages of the present disclosure will become clear by the following detailed description of exemplary embodiments of the present disclosure with reference to the accompanying drawings.

BRIEF DESCRIPTION OF THE DRAWINGS

In order to more clearly explain the technical solutions in the embodiments of the present disclosure or related technologies, the following will briefly introduce the drawings needed in the descriptions of the embodiments or related technical. Obviously, the drawings in the following description are only embodiments of the present disclosure. For those skilled in the art, other drawings can be obtained according to the provided drawings without any creative work.

In which:

1. seat body; 2. seat support; 3. support rod; 4. guide groove; 5. locking member; 6. first elastic member; 7. pull plate; 8. locking pillar; 9. second elastic member; 10. limit hole; 11. open slot; 12. chute; 13. limit slot; 14. first limit boss; 15. second limit boss.

DETAILED DESCRIPTION OF THE EMBODIMENTS

The following description will clearly and completely describe the technical solutions in the embodiments with reference to the accompanying drawings in the embodiments of the present disclosure. Apparently, the embodiments described are only part of the embodiments of the present disclosure, rather than all of them. All other embodiments obtained by those of ordinary skill in the art based on the embodiments of the present disclosure without any creative effort shall fall within the protection scope of the present disclosure.

In the description of the present disclosure, it should be understood that the terms "center", "transverse", "longitudinal", "front", "back", "left", "right", "upper", "lower", "vertical", "horizontal", "top", "bottom", "inner", "outer" and the like indicate the orientations or positional relationships based on the orientation or position relationships shown in the drawings. The terms are only for the convenience of describing the present disclosure and simplification of the description, but do not indicate or imply that the referred devices or units must have specific orientations or be constructed and operated in specific orientations. Therefore, the terms should not be understood to limit the present disclosure.

Figure 1:
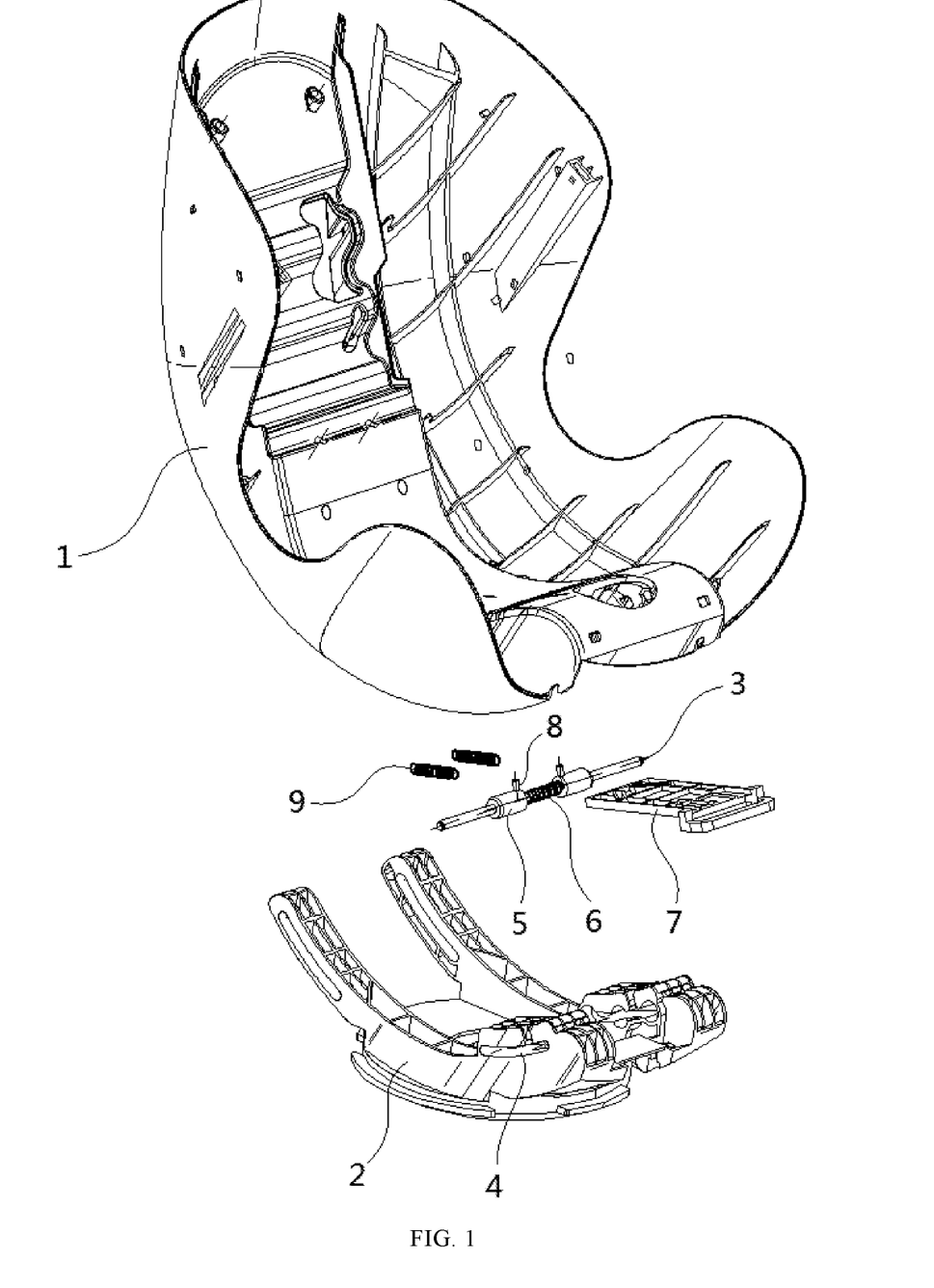
FIG. 1 is an exploded view of one embodiment of a safety seat according to the present disclosure.

As shown in FIG. 1, in an exemplary embodiment of a seat posture adjustment device provided by the present disclosure, the seat posture adjustment device includes a locking member 5, a support rod 3 arranged on a seat body 1 and a guide groove 4 formed in a seat support 2. The support rod 3 is inserted into the guide groove 4 to connect the seat body 1 and the seat support 2, and the support rod 3 can be moved in the guide groove 4 and guided via the guide groove 4 to realize the posture adjustment of the seat body 1. The locking member 5 is arranged on the support rod 3 and moves relative to the support rod 3 when the posture of the seat body 1 is adjusted to realize locking or unlocking between the seat body 1 and the seat support 2.

In the above embodiment, the locking member 5 is arranged on the support rod 3, and moves relative to the support rod 3 when the posture of the seat body 1 is adjusted to realize locking or unlocking between the seat body 1 and the seat support 2, in this way, the support rod 3 plays a certain role in guiding the movement of the locking member 5, so that the reset of the locking member 5 is smoother and more precise, and the reliability is improved. Moreover, the support rod 3 is arranged on the seat body 1 and inserted into the guide groove 4 formed in the seat support 2, and the support rod 3 remains stationary and can always play a role in connecting the seat body 1 and the seat support 2 during the movement of the locking member 5, so during the posture adjustment of the seat body 1, the deviation between the seat body 1 and the seat support 2 can be avoided, and the alignment of the seat body 1 and the seat support 2 can be maintained, which can further ensure the smooth reset of the locking member 5 and improve the adjustment performance of the seat posture adjustment device.

In one embodiment, the locking member 5 is of a hollow structure, is sleeved on the support rod 3, and can slide relative to the support rod 3 in the axial direction of the support rod 3. The locking member 5 is of a hollow structure and is sleeved on the support rod 3, so that the overall structure of the seat posture adjustment device can be more compact, and the occupied space is reduced. In addition, the support rod 3 can effectively guide the movement of the locking member 5, so that the movement of the locking member 5 is more precise.

Optionally, the seat posture adjustment device further includes a fitting structure for fitting with the locking member 5 to realize relative locking of the seat body 1 and the seat support 2 when the locking member 5 moves to a locking position capable of fitting with the fitting structure, and to release the relative locking of the seat body 1 and the seat support 2 when departing from the locking position.

The specific structural form of the fitting structure may be various as long as it can fit with the locking member 5 to realize locking or unlocking between the seat body 1 and the seat support 2.

Figure 2:
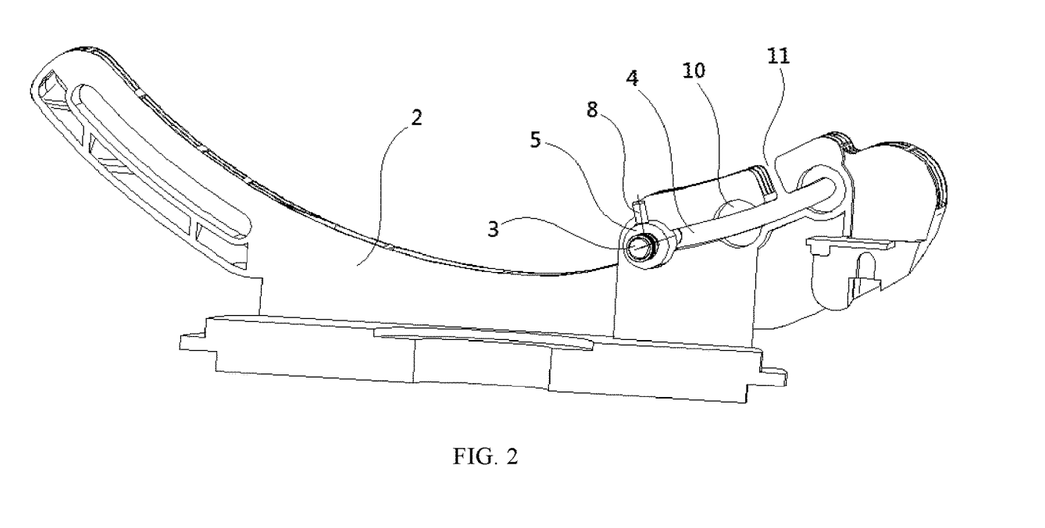
FIG. 2 is a structure diagram after a seat support in one embodiment of the safety seat according to the present disclosure is split from the middle.

In a preferred embodiment, as shown in FIG. 2, the fitting structure includes a plurality of limit holes 10 formed on the inner side of the seat support 2, the plurality of limit holes 10 are arranged along the trajectory of the guide groove 4, and the locking member 5 can be inserted into a limit hole 10 when moving to the locking position to realize the relative locking of the seat body 1 and the seat support 2; and the locking member 5 is disengaged from the limit hole 10 when departing from the locking position to release the relative locking of the seat body 1 and the seat support 2. The seat body 1 can be fixed at different postures by using the limit holes 10 as a fitting structure.

Optionally, the limit holes 10 are counter bores, which can prevent the locking member 5 from penetrating through the outer side of the seat support 2, causing the problem that the locking member 5 interferes with other components or is easily lost or damaged, thereby improving the reliability.

Optionally, the trajectory of the guide groove 4 is an arc. The guide groove 4 and the plurality of limit holes 10 are arranged along the arc to better fit the posture change of the seat body 1. The plurality of limit holes 10 are arranged along the trajectory of the guide groove 4, so that a plurality of locking positions of the locking member 5 can be kept in line with the moving direction of the support rod 3 to improve the overall coordination of the seat posture adjustment device.

The plurality of limit holes 10 may be arranged at intervals, that is, the space occupied by each of the limit holes 10 does not overlap each other; the plurality of limit holes 10 may also be arranged in an overlapping manner, that is, a part of space may be shared by the two adjacent limit holes 10 to increase the number of the adjustable posture angles, so that the seat body 1 has more postures.

Further, the seat posture adjustment device further includes a first elastic member 6 for resetting the locking member 5. By providing the first elastic member 6, the locking member 5 can be reset more smoothly and the operability can be improved.

Specifically, two locking members 5 are provided and can move relative to the support rod 3, the number of the first elastic member 6 is one and the first elastic member 6 includes a spring, the spring and the two locking members 5 are sleeved on the support rod 3, and the spring is arranged between the two locking members 5. One first elastic member 6 may be provided, one end of the first elastic member 6 is connected with one of the locking members 5, the other end is connected with the other locking member 5, and the positions of the first elastic member 6 and the two locking members 5 can be maintained under the action of a chute 12. In other embodiments, two first elastic members 6 may also be provided, one end of each first elastic member 6 is connected with the support rod 3, and the other end is connected with the corresponding locking member 5.

Optionally, the seat posture adjustment device may further include an operation member for forcing the locking member 5 to move relative to the support rod 3. By providing the operation member, the movement of the locking member 5 can be controlled. The locking and unlocking of the seat body 1 can be realized through the movement of the locking member 5. The locking member 5 is locked in a normal state and unlocked when the posture of the seat body 1 needs to be adjusted.

The specific structure of the operation member may be flexible as long as it can achieve its function.

Figure 3:
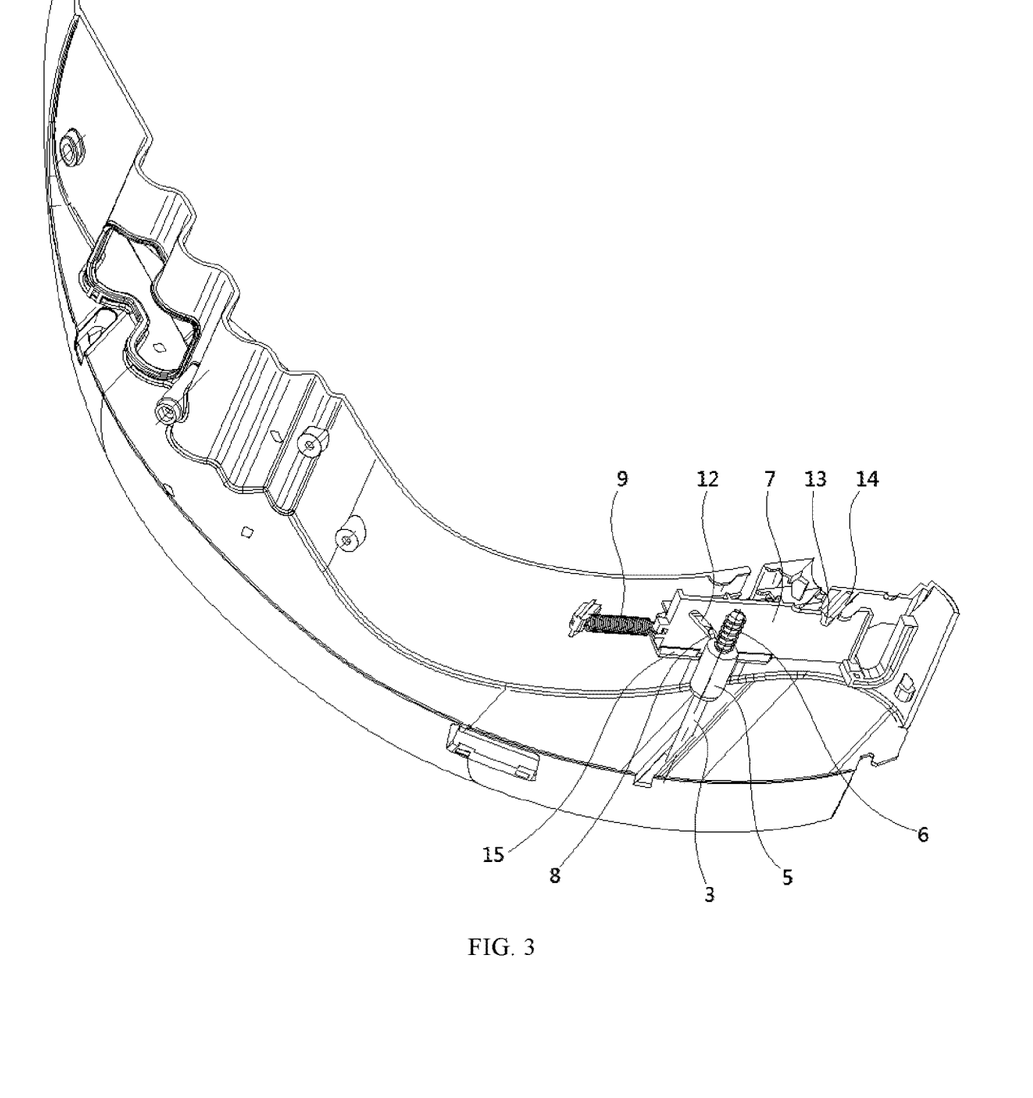
FIG. 3 is a structure diagram after a seat body in one embodiment of the safety seat according to the present disclosure is split from the middle.
Figure 4:
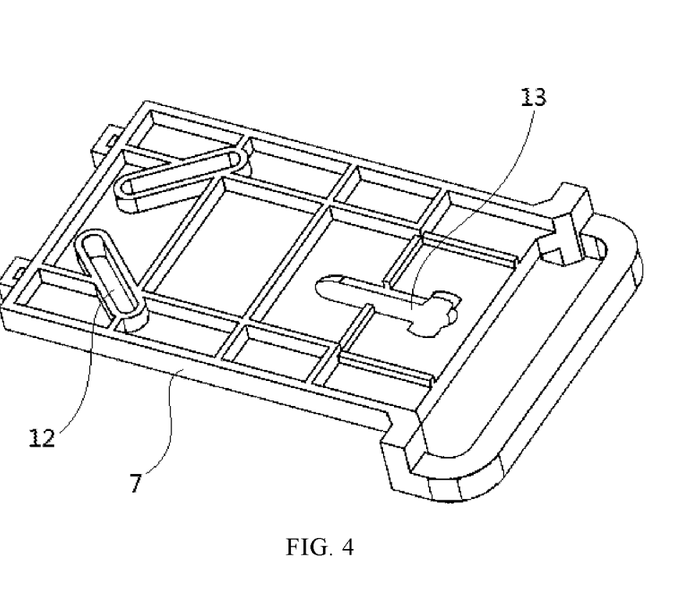
FIG. 4 is a structure diagram of a pull plate in one embodiment of a seat posture adjustment device according to the present disclosure.

Specifically, as shown in FIG. 3 and FIG. 4, the operation member may include a pull plate 7 arranged on the seat body 1, the pull plate 7 is provided with a chute 12 arranged obliquely with respect to the axial direction of the support rod 3, the locking member 5 is provided with a locking pillar 8 which is inserted into the chute 12, and the locking pillar 8 and the locking member 5 are driven through the chute 12 to move relative to the support rod 3 when the pull plate 7 is pulled. The structure that movements of the locking pillar 8 and the locking member 5 are driven through the chute 12 is simple, compact and high in reliability, needs a few parts, occupies a small space, and can also effectively ensure the movement stability of the locking member 5.

In one embodiment, the pull plate 7 is connected with a handle, and the handle is arranged on the bottom surface of the seat body 1 and close to the front end of the seat body 1 such that the operator pulls the pull plate 7 through the handle at the front end of the seat body 1. The handle can bring convenience for the operator to pull the pull plate 7. The pull plate 7 is operated by pulling at the front end of the seat body 1, which is more in line with the manual operation habit, and is convenient for posture adjustment by one-hand operation.

Optionally, the seat posture adjustment device further includes a second elastic member 9 connected to the pull plate 7, and the second elastic member 9 is used for resetting the pull plate 7. By providing the second elastic member 9, the pull plate 7 can be smoothly reset without great effort of the operator.

Specifically, the bottom surface of the seat body 1 is provided with a connecting boss, the second elastic member 9 may be a spring, one end of the spring is connected with the pull plate 7, and the other end of the spring is connected with the connecting boss. When the spring is at a natural length, the pull plate 7 is located on the lower inner side of the seat body 1. After the pull plate 7 is pulled out, the spring is stretched. After the posture adjustment is completed, the pull plate 7 is released and can be reset under the action of the spring.

Optionally, two second elastic members 9 are provided and arranged symmetrically about the center line of the pull plate 7. Thus, the resetting ability can be enhanced, and the movement of the pull plate 7 is more stable and reliable.

Optionally, the seat posture adjustment device further includes a first limit structure for limiting the maximum movement distance of the pull plate 7. By providing the first limit structure, the pull plate 7 can be prevented from moving excessively to break the locking pillar 8 so as to protect the locking pillar 8.

Specifically, as shown in FIG. 4, the first limit structure includes a first limit boss 14 formed on the seat body 1 and a limit slot 13 formed in the pull plate 7, and the first limit boss 14 is inserted into the limit slot 13 to limit the maximum movement distance of the pull plate 7 through the length of the limit slot 13.

Optionally, the seat posture adjustment device further includes a second limit structure for limiting the movement path of the pull plate 7 and maintaining the stability of movement of the pull plate 7. By providing the second limit structure, the movement of the pull plate 7 can be guided to ensure that the pull plate 7 moves according to the preset route and is prevented from movement deviation to cause the unlocking failure of the locking member 5.

Specifically, the second limit structure includes a substantially L-shaped second limit boss 15 formed on the seat body 1, the second limit boss 15 extends in the front and rear direction of the seat body 1, the pull plate 7 is located between the second limit boss 15 and the bottom surface of the seat body 1, and the pull plate 7 is supported by the second limit boss 15 and moved in the extending direction of the second limit boss 15.

Based on the seat posture adjustment device in each of the above embodiments, the present disclosure further provides a safety seat including the seat posture adjustment device.

Optionally, the safety seat further includes a seat support 2 provided with an open slot 11, and the open slot 11 communicates with the guide groove 4 to assemble the support rod 3 into the guide groove 4 through the open slot 11. The open slot 11 can facilitate the assembly of the support rod 3 and realize the detachable connection of the seat body 1 and the seat support 2.

Optionally, the seat posture adjustment device is arranged at a front end connection between the seat body 1 and the seat support 2, and the support rod can fit with the mounting groove at the rear end connection between the seat body 1 and the seat support 2 without resetting another seat posture adjustment device as long as the coordination of the front and rear adjustment is achieved.

The positive technical effects of the seat posture adjustment device in the above various embodiments are also applicable to the safety seat, and are not repeated herein.

The operating process of one embodiment of the seat posture adjustment device and the safety seat according to the present disclosure will be described below with reference to FIGS. 1-8.

As shown in FIGS. 1 to 4, the seat body 1 is provided with the support rod 3, the seat support 2 is provided with the guide groove 4, and the support rod 3 is inserted into the guide groove 4. The support rod 3 is sleeved with two locking members 5 and a first elastic member 6, and each locking member 5 is provided with a locking pillar 8 extending in the radial direction of the locking member 5. The inner side surface of the seat body 1 is provided with three limit holes 10, and an open slot 11 communicating with the guide groove 4. The pull plate 7 and the second elastic member 9 are arranged on the bottom surface of the seat body 1, the pull plate 7 is provided with the chutes 12, the locking pillars 8 are inserted into the chutes 12, the pull plate 7 is further provided with the limit slot 13, the first limit boss 14 formed on the bottom surface of the seat body 1 is inserted into the limit slot 13, the bottom surface of the seat body 1 is further provided with the L-shaped second limit boss 15, the pull plate 7 is arranged on the second limit boss 15, and the pull plate 7 is supported, guided to move and limited by the second limit boss 15.

Operation steps: the pull plate 7 is pulled forward by hand and slides forward in the limit direction of the second limit boss 15, the locking pillar 8 and the locking member 5 can be driven to move toward the middle under the action of the chute 12 during sliding, the locking member 5 is disengaged from the limit hole 10, the support rod 3 at the moment can slide freely in the guide groove 4 to realize the posture adjustment of the seat, the pull plate 7 is released when the locking member 5 moves to the next corresponding limit hole 10 and reset under the action of the second elastic member 9, the locking member 5 enters the limit hole 10 under the action of the first elastic member 6, and the support rod 3 at the moment cannot continue to slide, thereby achieving the purpose of locking the seat body 1.

Figure 5:
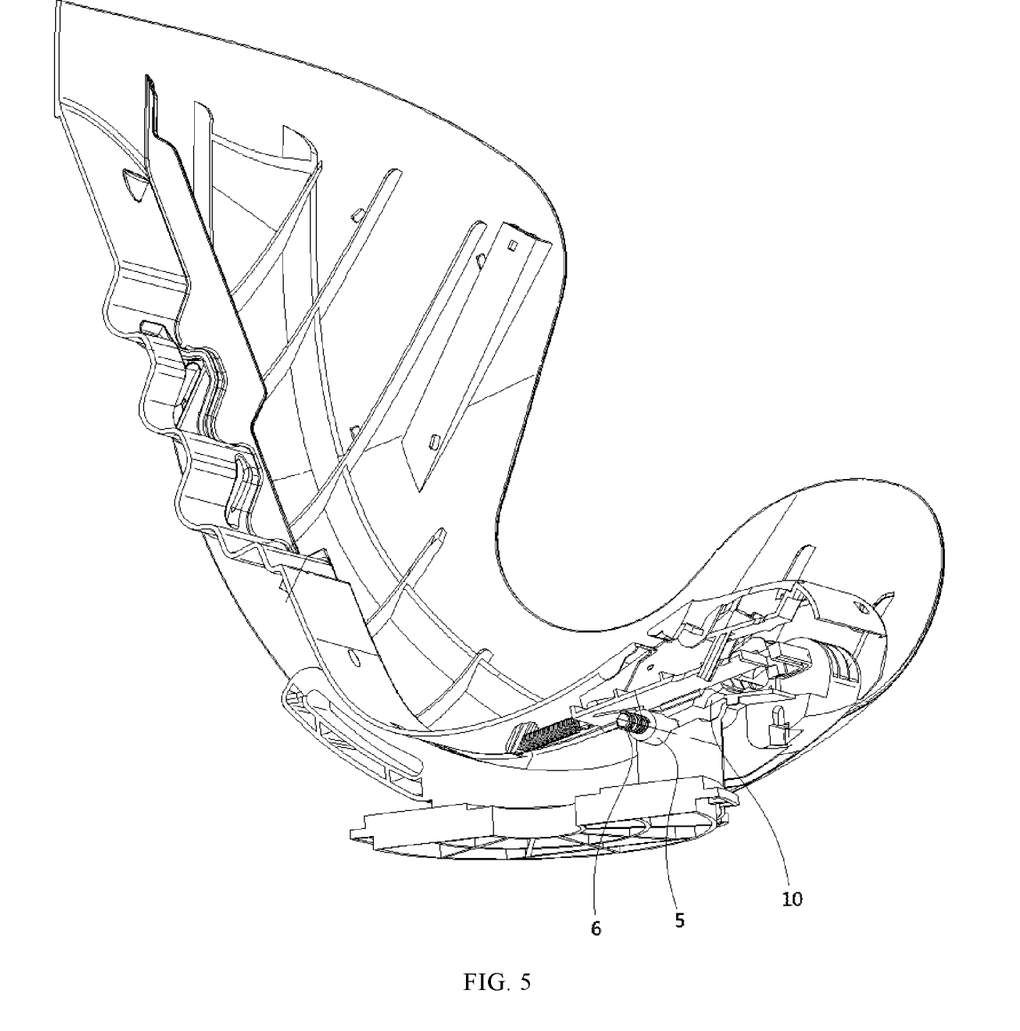
FIG. 5 is a structure diagram of one embodiment of the safety seat according to the present disclosure in a first state during posture adjustment.

Specifically, as shown in FIG. 5, in the normal state, the first elastic member 6 is at a natural length, the locking member 5 is inserted into the innermost limit hole 10, and the seat body 1 and the seat support 2 are locked.

Figure 6:
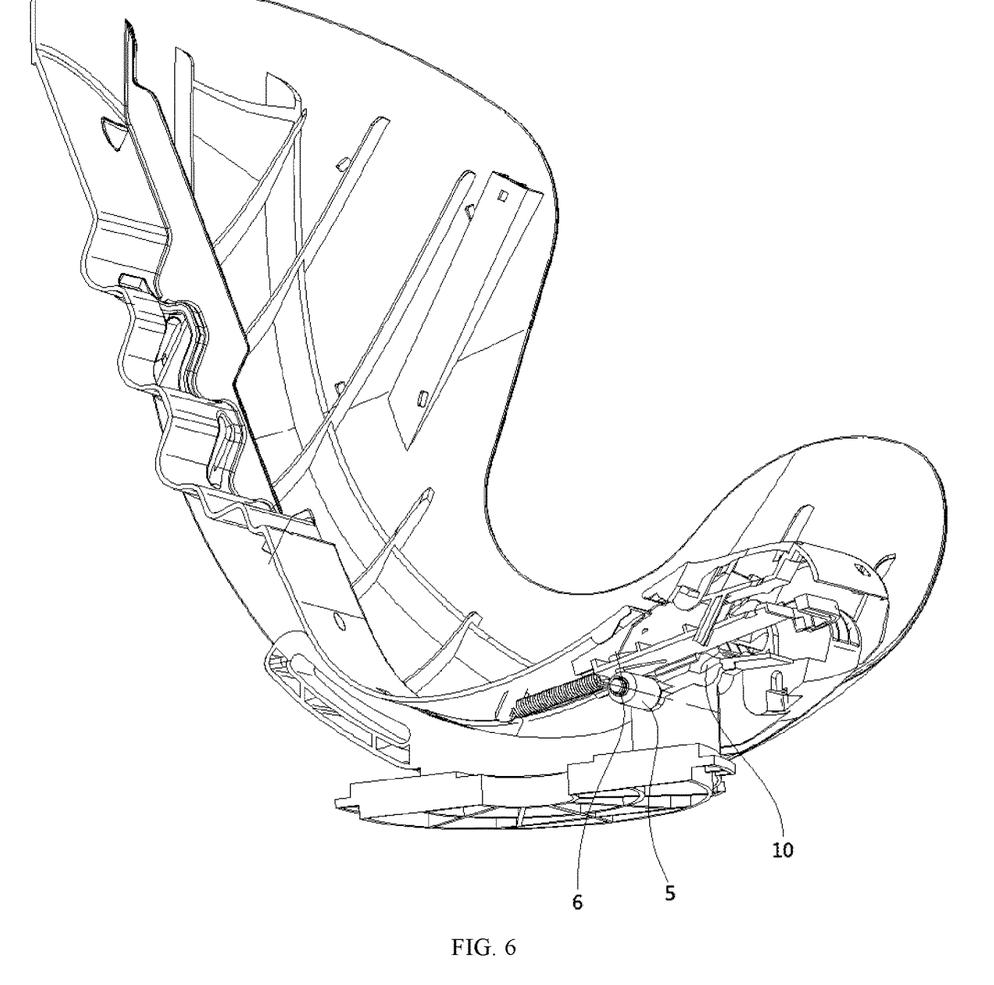
FIG. 6 is a structure diagram of one embodiment of the safety seat according to the present disclosure in a second state during posture adjustment.

As shown in FIG. 6, the pull plate 7 is pulled forward. During the sliding process of the pull plate 7, the locking pillar 8 and the locking member 5 move inward relative to the support rod 3 under the drive of the chute 12, the first elastic member 6 is compressed, the locking member 5 is disengaged from the limit hole 10, the seat body 1 and the seat support 2 are unlocked, and the user can adjust the posture of the seat body 1 as needed.

Figure 7:
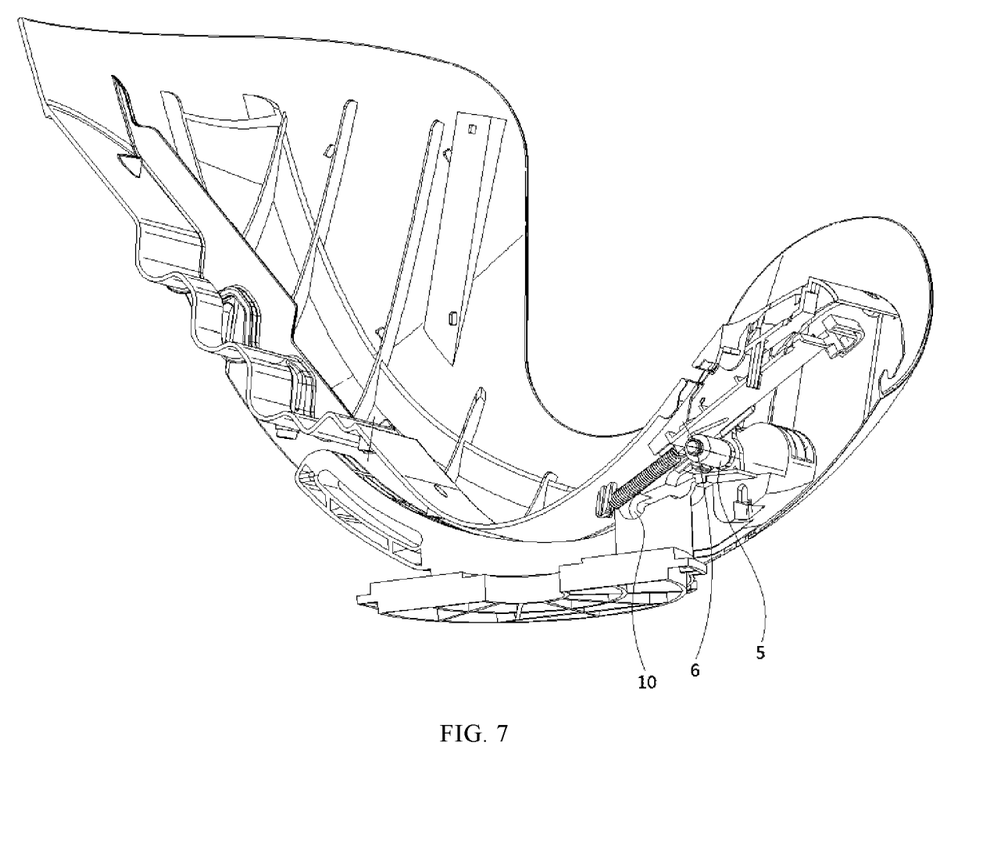
FIG. 7 is a structure diagram of one embodiment of the safety seat according to the present disclosure in a third state during posture adjustment.

As shown in FIG. 7, the seat body 1 is adjusted to align the locking member 5 with the outermost limit hole 10, and the posture of the seat body 1 has been changed.

Figure 8:
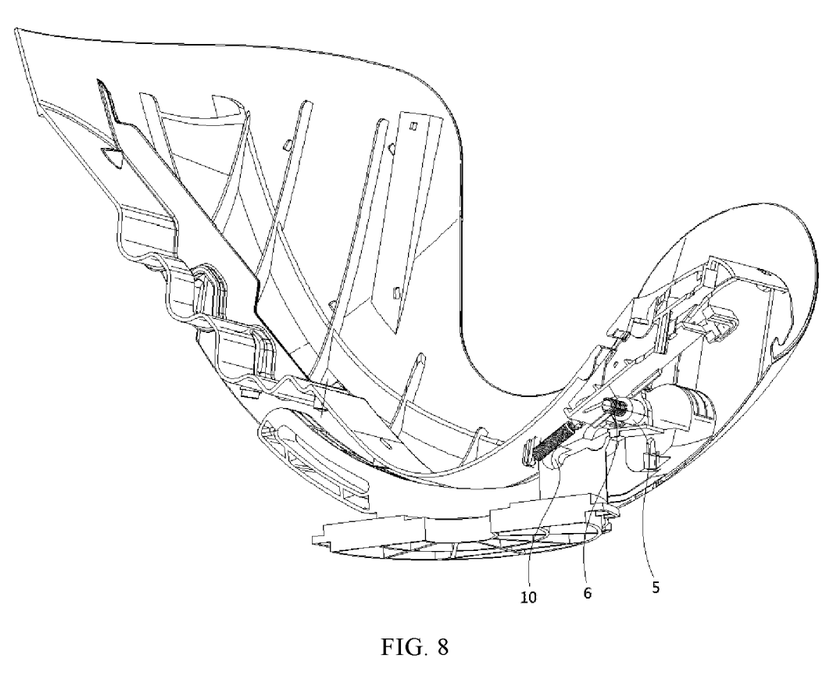
FIG. 8 is a structure diagram of one embodiment of the safety seat according to the present disclosure in a fourth state during posture adjustment.

As shown in FIG. 8, the pull plate 7 is released and reset under the action of the second elastic member 9. Under the action of the chute 12 and the first elastic member 6, the locking member 5 moves outward relative to the support rod 3 till being inserted into the limit hole 10, the seat body 1 and the seat support 2 are relocked, and the posture adjustment process is completed.

The terms "front", "rear", "inner" and "outer" mentioned in the description of the above process are based on the state after the seat is installed, but do not limit the structure and installation direction of the seat. Simple substitutions within the understandable scope of those skilled in the art shall be within the scope of the present disclosure.

Through the description of various embodiments of the seat posture adjustment device and the safety seat of the present disclosure, it can be seen that the seat posture adjustment device and the safety seat of the present disclosure have at least one or more of the following advantages:

1. The locking member is arranged on the support rod, and the locking and unlocking between the seat body and the seat support are realized by the movement of the locking member relative to the support rod, so that in the unlocking state, the support rod can still play a role in connecting the seat body and the seat support, the alignment of the seat body and the seat support is ensured, the locking member can be smoothly reset, and the support rod itself has a certain guiding effect on the movement of the locking member;

2. The locking member is of a hollow structure and sleeved on the support rod, so that the overall structure is more compact and the occupied space is reduced;

3. The locking member is provided with a locking pillar, the pull plate is provided with a chute, and the locking pillar and the locking member can be driven to move through the chute when the pull plate is moved, so that the locking member is locked, the structure is simple, the movement is reliable, and the applicability is strong;

4. The seat body is provided with a limit structure for limiting the movement distance and movement path of the pull plate, thereby improving the accuracy and controllability of movement of the pull plate.

Finally, it should be noted that the above embodiments are only for describing, instead of limiting, the technical solutions of the present disclosure. Although the present disclosure has been described in detail with reference to the preferred embodiments, those of ordinary skill in the art should understood that the specific embodiments of the present disclosure may still be modified, or part of the technical features may be equivalently substituted without departing from the spirit of the technical solutions of the present disclosure, and such modifications or substitutions shall fall within the scope of the technical solutions of the present disclosure.

What is claimed:

1. A seat posture adjustment device, comprising:
a seat body (1);
a seat support (2);
a guide groove (4), formed in the seat support (2);
a support rod (3), arranged on the seat body (1) and inserted into the guide groove (4) to connect the seat body (1) and the seat support (2), and the support rod (3) is movable along the guide groove (4) to realize the posture adjustment of the seat body (1); and
a locking member (5), arranged on the support rod (3) and movable relative to the support rod (3) to realize locking or unlocking between the seat body (1) and the seat support (2).

2. The seat posture adjustment device according to claim 1, wherein the locking member (5) is hollow and sleeved on the support rod (3), and is slidable relative to the support rod (3) in the axial direction of the support rod (3).

3. The seat posture adjustment device according to claim 1, further comprising a fitting structure, the fitting structure is fit with the locking member (5) to realize relative locking of the seat body (1) and the seat support (2) when the locking member (5) moves to a locking position, and disengages the fitting with the locking member (5) to release the relative locking of the seat body (1) and the seat support (2) when the locking member (5) departs from the locking position.

4. The seat posture adjustment device according to claim 3, wherein the fitting structure comprises a plurality of limit holes (10) formed on the inner side of the seat support (2), the plurality of limit holes (10) are arranged along the trajectory of the guide groove (4), and the locking member (5) is inserted into a limit hole (10) to realize the relative locking of the seat body (1) and the seat support (2) when the locking member (5) moves to the locking position; and is disengaged from the limit hole (10) to release the relative locking of the seat body (1) and the seat support (2) when the locking member (5) departs from the locking position.

5. The seat posture adjustment device according to claim 4, wherein the trajectory of the guide groove (4) is an arc.

6. The seat posture adjustment device according to claim 4, wherein the limit holes (10) are counter bores.

7. The seat posture adjustment device according to claim 1, further comprising a first elastic member (6) for resetting the locking member (5).

8. The seat posture adjustment device according to claim 7, comprising two locking members (5) movable relative to the support rod (3), the first elastic member (6) comprises a spring, the spring and the two locking members (5) are sleeved on the support rod (3), and the spring is arranged between the two locking members (5).

9. The seat posture adjustment device according to claim 1, further comprising an operation member, the operation member is configured to force the locking member (5) to move relative to the support rod (3).

10. The seat posture adjustment device according to claim 9, wherein the operation member comprises a pull plate (7) arranged on the seat body (1), the pull plate (7) is provided with a chute (12) arranged obliquely with respect to the axial direction of the support rod (3), the locking member (5) is provided with a locking pillar (8) which is inserted into the chute (12), and the locking pillar (8) and the locking member (5) are driven through the chute (12) to move relative to the support rod (3) when the pull plate (7) is pulled.

11. The seat posture adjustment device according to claim 10, further comprising a handle connected with the pull plate (7), and the handle is arranged on the bottom surface of the seat body (1) and close to the front end of the seat body (1).

12. The seat posture adjustment device according to claim 10, further comprising a second elastic member (9) connected to the pull plate (7) for resetting the pull plate (7).

13. The seat posture adjustment device according to claim 12, wherein two second elastic members (9) are arranged symmetrically about a center line of the pull plate (7).

14. The seat posture adjustment device according to claim 10, further comprising a first limit structure for limiting the maximum movement distance of the pull plate (7).

15. The seat posture adjustment device according to claim 14, wherein the first limit structure comprises a first limit boss (14) on the seat body (1) and a limit slot (13) in the pull plate (7), the first limit boss (14) is inserted into the limit slot (13) to limit the maximum movement distance of the pull plate (7).

16. The seat posture adjustment device according to claim 10, further comprising a second limit structure for limiting the movement path of the pull plate (7).

17. The seat posture adjustment device according to claim 16, wherein the second limit structure comprises a substantially L-shaped second limit boss (15) on the seat body (1), the second limit boss (15) extends in the front and rear direction of the seat body (1), the pull plate (7) is located between the second limit boss (15) and the bottom surface of the seat body (1), and the pull plate (7) is supported by the second limit boss (15) and movable in the extending direction of the second limit boss (15).

18. A safety seat, comprising the seat posture adjustment device according to claim 1.

19. The safety seat according to claim 18, wherein the seat support (2) is provided with an open slot (11), the open slot (11) communicates with the guide groove (4), and the support rod (3) is assembled into the guide groove (4) through the open slot (11).

* * * * *